United States Patent
Shekhar et al.

(10) Patent No.: US 12,137,409 B2
(45) Date of Patent: Nov. 5, 2024

(54) REGISTRATION PROCEDURE FOR ENSURING SERVICE BASED ON A SELECTION OF THE BEST AVAILABLE NETWORK SLICE OF THE SAME SLICE TYPE

(71) Applicant: Cisco Technology, Inc., San Jose, CA (US)

(72) Inventors: Ravi Shekhar, Pune (IN); Aditya Prakash, Bangalore (IN); Amit Shivhare, Gurgaon (IN); Vimal Srivastava, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 307 days.

(21) Appl. No.: 17/509,802

(22) Filed: Oct. 25, 2021

(65) Prior Publication Data

US 2023/0132096 A1    Apr. 27, 2023

(51) Int. Cl.
*H04W 48/18* (2009.01)
*H04W 8/18* (2009.01)
(Continued)

(52) U.S. Cl.
CPC ............. *H04W 48/18* (2013.01); *H04W 8/18* (2013.01); *H04W 60/00* (2013.01); *H04W 72/54* (2023.01); *H04W 72/563* (2023.01); *H04W 76/10* (2018.02)

(58) Field of Classification Search
CPC ... H04W 48/18; H04W 72/563; H04W 72/54; H04W 8/18; H04W 60/00; H04W 76/10
See application file for complete search history.

(56) References Cited

U.S. PATENT DOCUMENTS

2016/0353268 A1* 12/2016 Senarath ............... H04L 47/805
2018/0270744 A1*  9/2018 Griot ..................... H04W 88/18
(Continued)

FOREIGN PATENT DOCUMENTS

WO    2021092561 A1    5/2021
WO    2021136599 A1    7/2021

OTHER PUBLICATIONS

Tech-Invite, "Content for TS 23.502 Word version: 17.2.1", retrieved from Internet Oct. 18, 2021, 15 pages; https://www.tech-invite.com/3m23/toc/tinv-3gpp-23-502_c.html.

(Continued)

*Primary Examiner* — Wayne H Cai

(74) *Attorney, Agent, or Firm* — Edell, Shapiro & Finnan, LLC

(57) ABSTRACT

A control plane (CP) function for mobility management may receive, from a user equipment (UE), a message which indicates a registration request for registration to a network slice. The CP function may select, as an allowed slice ID, a first slice ID of a first network slice in which to register the UE. The first slice ID has a slice/service type (SST) value indicating an SST and a first slice differentiator (SD) value associated with a first level of service to be provided. The CP function may alternatively select, as the allowed slice ID, a second slice ID of a second network slice in which to register the UE based on unavailability of the slice type associated with the first level of service. The second slice ID (Continued)

has the SST value indicating the slice type and a second SD value associated with a second level of service to be provided.

20 Claims, 11 Drawing Sheets

(51) Int. Cl.
*H04W 60/00* (2009.01)
*H04W 72/54* (2023.01)
*H04W 72/563* (2023.01)
*H04W 76/10* (2018.01)

(56) References Cited

U.S. PATENT DOCUMENTS

| | | | |
|---|---|---|---|
| 2019/0174561 A1* | 6/2019 | Sivavakeesar | H04W 76/10 |
| 2019/0357129 A1 | 11/2019 | Park et al. | |
| 2019/0394715 A1* | 12/2019 | Prasad | H04W 48/16 |
| 2020/0252862 A1 | 8/2020 | Kim | |
| 2021/0212010 A1 | 7/2021 | Lee et al. | |
| 2021/0392501 A1* | 12/2021 | Buyukdura | H04L 67/10 |
| 2022/0417101 A1* | 12/2022 | Ding | H04L 41/0894 |
| 2023/0049321 A1* | 2/2023 | Gundavelli | H04W 8/06 |
| 2024/0015599 A1* | 1/2024 | Godin | H04W 36/22 |

OTHER PUBLICATIONS

3GPP, "3rd Generation Partnership Project; Technical Specification Group Core Network and Terminals; Non-Access-Stratum (NAS) protocol for 5G System (5GS); Stage 3; (Release 17)", 3GPP TS 24.501 V17.4.1, Sep. 2021, 863 pages.
ITecTec, "5.2.3 UDM Services", TS 23.502 3GPP, Release 17, Procedures for the 5G Systems (5GS), retrieved from Internet Oct. 5, 2021, 34 pages; https://itectec.com/spec/5-2-3-udm-services/.
Adrián Gallego et al., "Design of network slicing and supporting systems v1", Deliverable D1.2, 5G-VINNI H2020-ICT-2018-1/ 815279, Mar. 21, 2019, 85 pages.
3GPP 5G, "3rd Generation Partnership Project; Technical Specification Group Services and System Aspects; Procedures for the 5G System (5GS); Stage 2 (Release 17)," 3GPP TS 23.502 V17.2.1, Sep. 2021, 712 pages.
3GPP 5G, "3rd Generation Partnership Project; Technical Specification Group Services and System Aspects; System architecture for the 5G System (5GS); Stage 2 (Release 17)," 3GPP TS 23.501 V17.2.0, Sep. 2021, 542 pages.

* cited by examiner

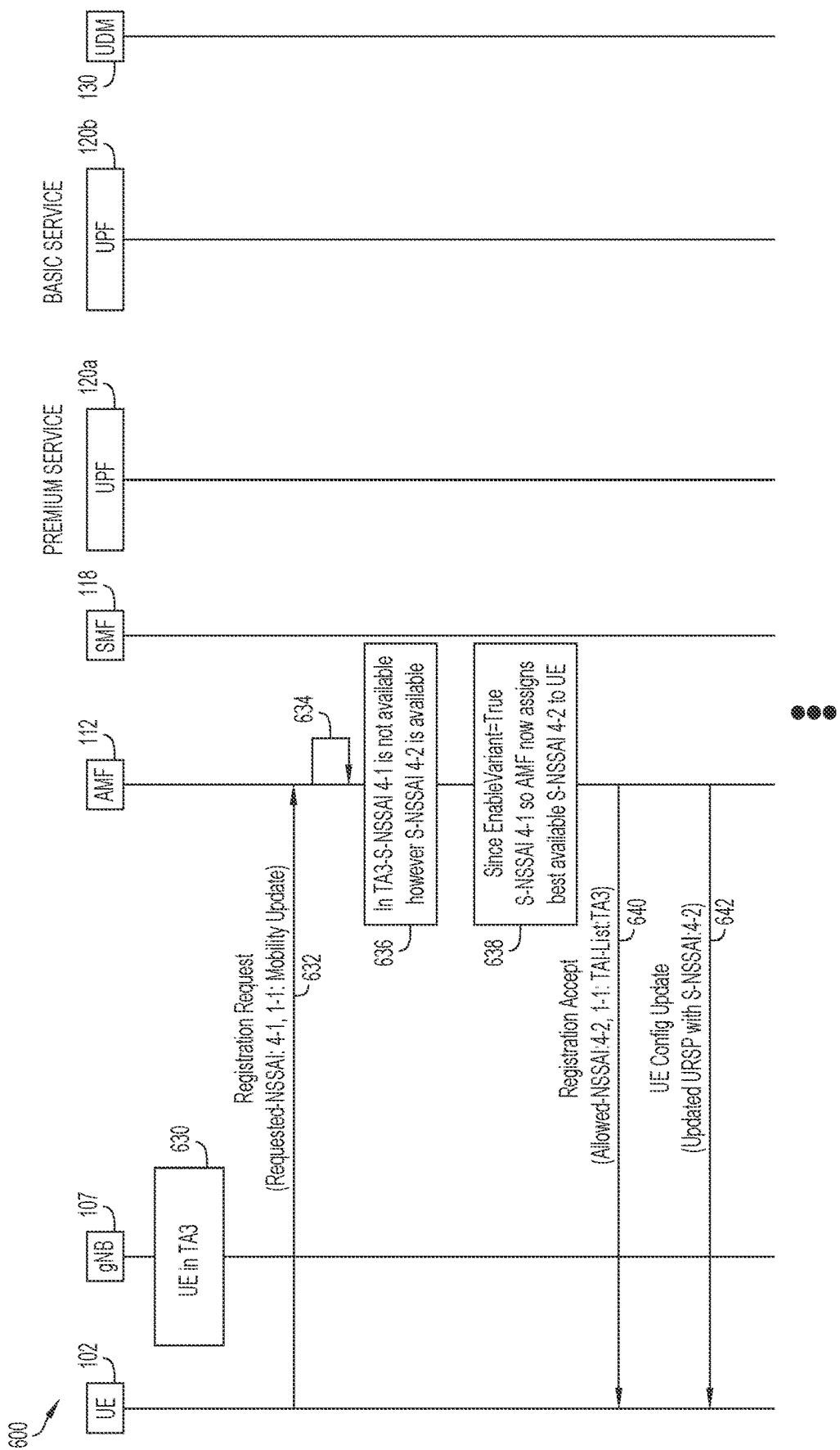

REGISTRATION PROCEDURE FOR ENSURING SERVICE BASED ON A SELECTION OF THE BEST AVAILABLE NETWORK SLICE OF THE SAME SLICE TYPE

TECHNICAL FIELD

The present disclosure relates generally to telecommunications systems, and more particularly to techniques and mechanisms of a registration procedure for ensuring service for a user equipment (UE) based on a selection of a best available (or alternative) network slice of the same slice type, where different levels of services may be provided for the slice type.

BACKGROUND

Fifth Generation (5G) network operation is defined in Third Generation Partnership Project (3GPP) standards. In a 5G network, network slicing is employed to allow operators to logically divide the network into multiple distinct slices, each of which has specific network characteristics and capabilities.

Each slice in the 5G network may be identified by an identifier referred to as Single Network Slice Selection Assistance information (S-NSSAI). The S-NSSAI includes a slice/service type (SST) indicator of the slice/service type and a slice differentiator (SD) indicator which helps in differentiating slices of the same slice type. Different slice/service types or SSTs may include enhanced Mobile Broadband (eMBB), Internet of Things (IoT), Vehicle-to-everything (V2X), and Ultra-Reliable Low-Latency Communication (URLLC).

A practical approach for an operator of a 5G network is to deploy two (2) or three (3) different variants of a given slice type, in order to provide different levels of service to accommodate different market segments and/or monetization schemes. For example, if SST=1 for eMBB, SD=1 may be offered for "premium service" for eMBB and SD=2 may be offered for "basic service" for eMBB. However, the operator may or may not offer all of the different variants or service levels associated with the slice type in each location. For example, basic service for eMBB may be offered in most all locations, while the premium service may be available only in well-populated locations.

In current 3GPP standards, there is a limitation of eight (8) S-NSSAIs for each UE. This limitation may frustrate a subscriber of a UE from subscribing to all of the variants or different service levels associated with a given slice type, as the UE would then not be able to hold subscriptions to other needed slice types. This may adversely affect the availability of service for the UE in many locations. For example, if a UE subscribes to only premium service for eMBB and travels outside of one of its available locations, then the UE will not be registered to any network slice for eMB, even through the basic service is made available. Even if the operator would offer and allow the subscriber to purchase separate subscriptions to each one of the variants, it may be unlikely that the subscriber would subscribe to all of these variants just to ensure availability. Further, there a current limitation on the size of a UE Route Selection Policy (URSP) as stored in the UE. A large number of S-NSSAIs may result in a large number of UE policies, and therefore, an increased size of URSPs.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 6A, 6B, and 6C form a call flow diagram of a call flow for describing registration procedures for ensuring service based on a selection of a best available (or alternative) network slice of the same slice type according to some implementations of the present disclosure, where different levels of services may be provided for the slice type.

DESCRIPTION OF EXAMPLE EMBODIMENTS

Figure 1A:
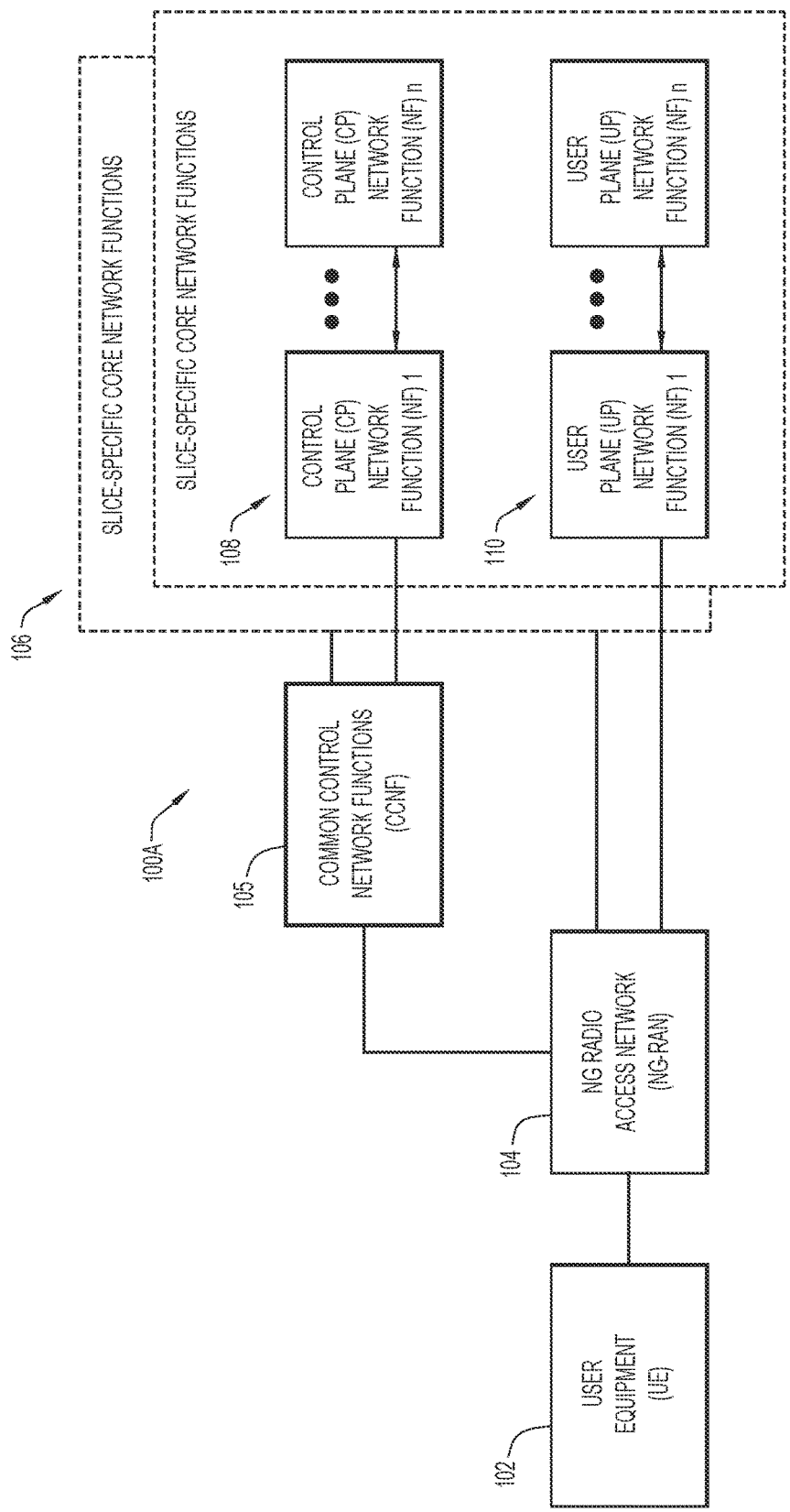
FIG. 1A is an illustrative representation of a basic network architecture of a Fifth Generation (5G) network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms are described herein for a registration procedure for ensuring service for a user equipment (UE) based on a selection of a best available (or alternative) network slice of the same slice type, where different levels of services may be provided for the slice type.

In one illustrative example, a control plane (CP) function for mobility management may receive, from a UE, a message which indicates a registration request for registration to a network slice. The CP function may select, as an allowed slice ID, a first slice ID of a first network slice in which to register the UE. The first slice ID may have a slice/service type (SST) value indicating an SST and a first slice differentiator (SD) value associated with a first level of service (e.g. a "premium" service) to be provided. On the other hand, the CP function may alternatively select, as the allowed slice ID, a second slice ID of a second network slice in which to register the UE based on unavailability of the slice type associated with the first level of service. The second slice ID may have the SST value indicating the slice type and a second SD value associated with a second level of service (e.g. a "basic" service) to be provided. The CP function may then send, to the UE, a message which indicates a registration accept including the allowed slice ID. Accordingly, a UE may be provided with the best available or alternative level of service for the requested slice type.

More detailed and alternative techniques and implementations are provided herein as described below.

Example Embodiments

FIG. 1A is an illustrative representation of a general network architecture 100A of a Fifth Generation (5G) network. Network architecture 100A includes common control network functions (CCNF) 105 and a plurality of slice-specific core network functions 106. In general, the 5G network is configured to facilitate communications for mobile devices, such as a user equipment (UE) 102. UE 102 may be any suitable type of device, such as a cellular telephone, a smart phone, a tablet device, an Internet of Things (IoT) device, a Machine-to-Machine (M2M) device, and a sensor, to name but a few. UE 102 may obtain access to the 5G Core (5GC) of the 5G network via a radio access network (RAN), which may be or include a Next Generation (NG) RAN (NG-RAN) 104. NG-RAN 104 may include one or more base stations or gNodeBs (gNBs), such as a gNB 107.

Network architecture 100A of the 5G network may be a Service-Based Architecture (SBA) which provides a modular framework from which common applications can be deployed using components of varying sources and suppliers. The SBA of the 5G network may be configured such that control plane functionality and common data repositories are provided by way of a set of interconnected Network Functions (NFs), each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105.

Slice-specific core network functions 106 of the network slices may be separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a Session Management Function (SMF), whereas UP NFs 110 may include, for example, a User Plane Function (UPF).

Figure 1B:
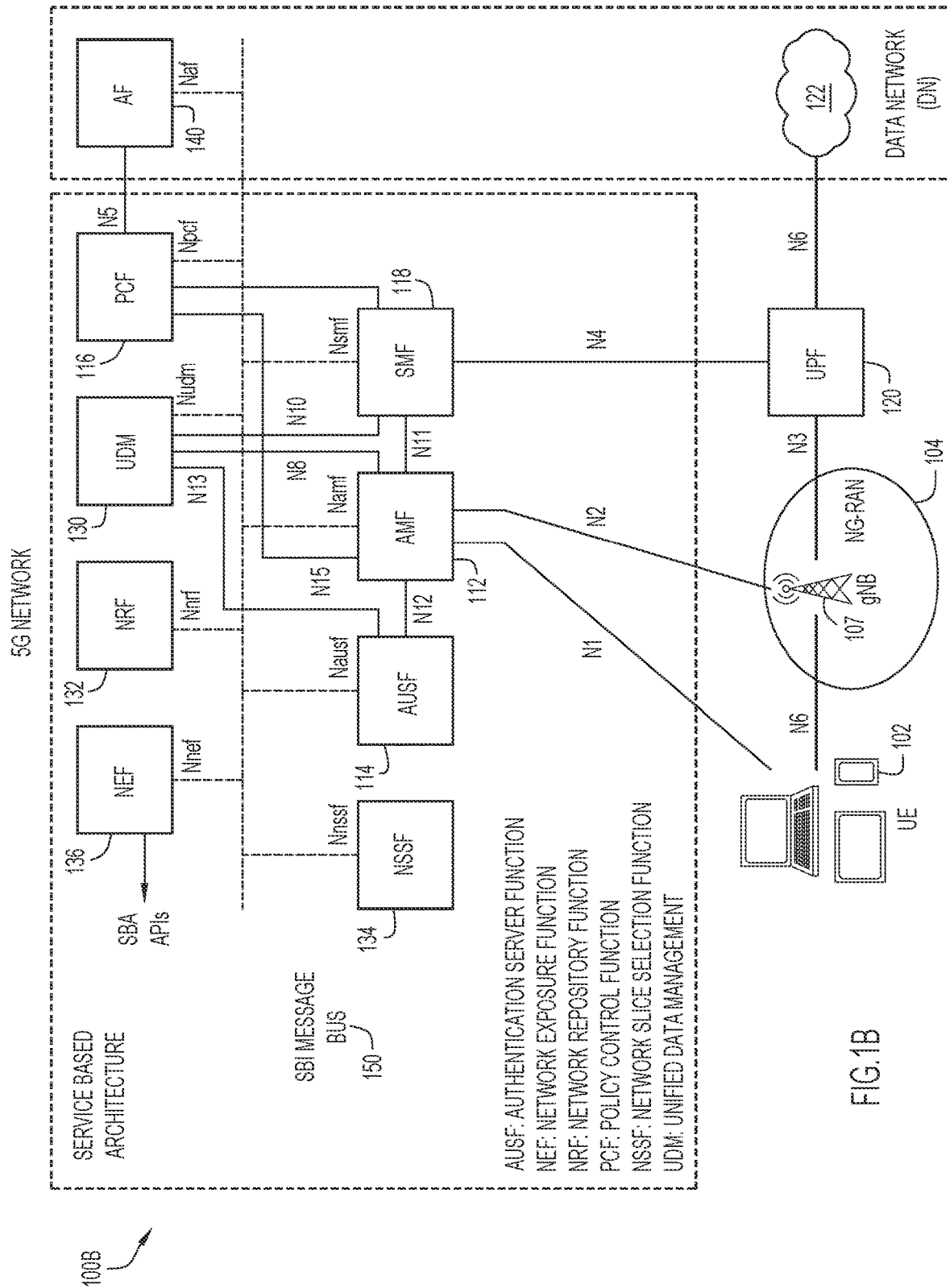
FIG. 1B is an illustrative representation of a more detailed network architecture of the 5G network of FIG. 1A, showing a Service-Based Architecture (SBA) or an enhanced SBA (eSBA) of the 5G network.

FIG. 1B is an illustrative representation of a more detailed network architecture 100B of the 5G network of FIG. 1A. In Third Generation Partnership Project (3GPP) standards for 5G (e.g. 3GPP Technical Specifications or "TS" 23.501 and 23.502), network architecture 100B for the 5G network may include an AMF 112, an Authentication Server Function (AUSF) 114, a Policy Control Function (PCF) 116, an SMF 118, and a UPF 120 which may connect to a Data Network (DN) 122. Other NFs in the 5G network include an NSSF 134, a Network Exposure Function (NEF) 136, an NF repository function (NRF) 132, and a Unified Data Management (UDM) function 130.

In FIG. 1B, UPF 120 is part of the user plane and all other NFs (i.e. AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling. A plurality of interfaces and/or reference points N1-N8, N10-N13, and N15 shown in FIG. 1B (as well as others) may define the communications and/or protocols between each of the entities, as described in the relevant (evolving) standards documents.

The SBA of the 5G network is better illustrated in FIG. 1B, whereby the control plane functionality and common data repositories are provided by way of the set of interconnected NFs. Assuming the role of either service consumer or service producer, NFs may be self-contained, independent and reusable. With the SBA, each NF service may expose its functionality through a Service Based Interface (SBI) message bus 150. SBI message bus 150 may employ a Representational State Transfer (REST) interface (e.g. using Hypertext Transfer Protocol Version 2 or "HTTP/2"). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for AF 140.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context. One or more application functions, such as an Application Function (AF) 140 may connect to the 5G network. AF 140 may interact with the network via NEF 136 in order to access network capabilities. NEF 136 may securely expose network capabilities and events provided by NFs to AF 140, and may provide a means for AF 140 to securely provide information to the 5G network.

An NF instance is an identifiable instance of an NF. In general, NRF 132 may maintain NF profiles of available NF instances and their associated services, and support a service discovery function for service discovery associated with the NF profiles. NF profiles of NF instances maintained in NRF 132 may include NF instance ID, NF type (e.g. AMF, SMF, PCR, UPF, etc.), network slice identifiers such as NSI ID, NF capacity information, names of supported services, etc. For service discovery, NRF 132 may receive a discovery request from an NF instance and provide information associated with the discovered NF instance to the NF instance in response.

In some implementations, the SBA of FIG. 1B may be an enhanced eSBA architecture, introduced in Release 16 of the 3GPP standards, which defines what are referred to as NF Sets and NF Service Sets. More particularly, an NF Set is a group of interchangeable NF instances of the same type, supporting the same services and the same network slice. The NF instances of the same NF Set may be geographically distributed but have access to the same context data. On the other hand, an NF service is a functionality exposed by an NF through the SBI and consumed by other authorized NFs. An NF service instance is an identifiable instance of an NF service, and an NF service operation is an elementary unit of which an NF service is composed. An NF Service Set is a group of interchangeable NF service instances of the same service type within an NF instance. The NF service instances in the same NF Service Set have access to the same context data.

In a 5G network, network slicing is employed to allow operators to logically divide the network into multiple distinct slices, each of which has specific network characteristics and capabilities. Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and Service Level Agreements (SLAs), and may include the virtualized resources required to service the needs of a Mobile Virtual Network Operator (MVNO) or group of subscribers, including a dedicated UPF 120, SMF 118, and PCF 116.

Each network slice in the 5G network may be identified by an identifier which may be referred to as Single Network Slice Selection Assistance information (S-NSSAI). The S-NSSAI includes a slice/service type (SST) indicator of the slice/service type and a slice differentiator (SD) indicator which helps in differentiating network slices of the same slice type. Different slice/service types or SSTs may include enhanced Mobile Broadband (eMBB), Massive IoT (MIoT), Vehicle-to-everything (V2X), massive Machine-Type Communication (mMTC), and Ultra-Reliable Low-Latency Communication (URLLC).

When UE 102 registers to the 5GC, it sends to AMF 112 a registration request which includes a Requested NSSAI and receives an Allowed NSSAI from the 5GC in response. The Allowed NSSAI may be selected based on the subscription of UE 102 and other criteria. The other criteria may include, for example, include location, network conditions, access-types, operator policies, etc. On receiving the Allowed NSSAI, UE 102 may establish a Protocol Data Unit (PDU) Session to access the intended services.

A practical approach for an operator of a 5G network is to deploy two (2) or three (3) different variants of a given slice type, in order to provide different levels of service to accommodate different market segments and/or monetization schemes. Network slice mobility may be supported by having slice support per Tracking Area (TA). Based on various business use cases, a different slice differentiator and service would be used for the same slice type in different geographical areas according to coverage. For example, if SST=1 for eMBB, SD=1 may be offered for "premium service" for eMBB and SD=2 may be offered for "basic service" for eMBB. However, the operator may or may not offer all of the different variants or service levels associated with the slice type in each location. For example, basic service for eMBB may be offered in most all locations, while the premium service may be available only in well-populated locations.

In current 3GPP standards, there is a limitation of eight (8) S-NSSAIs for each UE. This limitation may frustrate a subscriber of a UE from subscribing to all of the variants or different service levels associated with a given slice type, as the UE would then not be able to hold subscriptions to other needed slice types. This may adversely affect the availability of service for the UE in many locations. For example, if a UE subscribes to only premium service for eMBB and travels outside of one of its available locations, then the UE will not be registered to any network slice for eMB, even through the basic service is made available. Even if the operator would offer and allow the subscriber to purchase separate subscriptions to each one of the variants, it may be unlikely that the subscriber would subscribe to all of these variants just to ensure availability. Further, there a current limitation on the size of a UE Route Selection Policy (URSP) as stored in the UE. A large number of S-NSSAIs may result in a large number of UE policies, and therefore, an increased size of URSPs.

Figure 2:
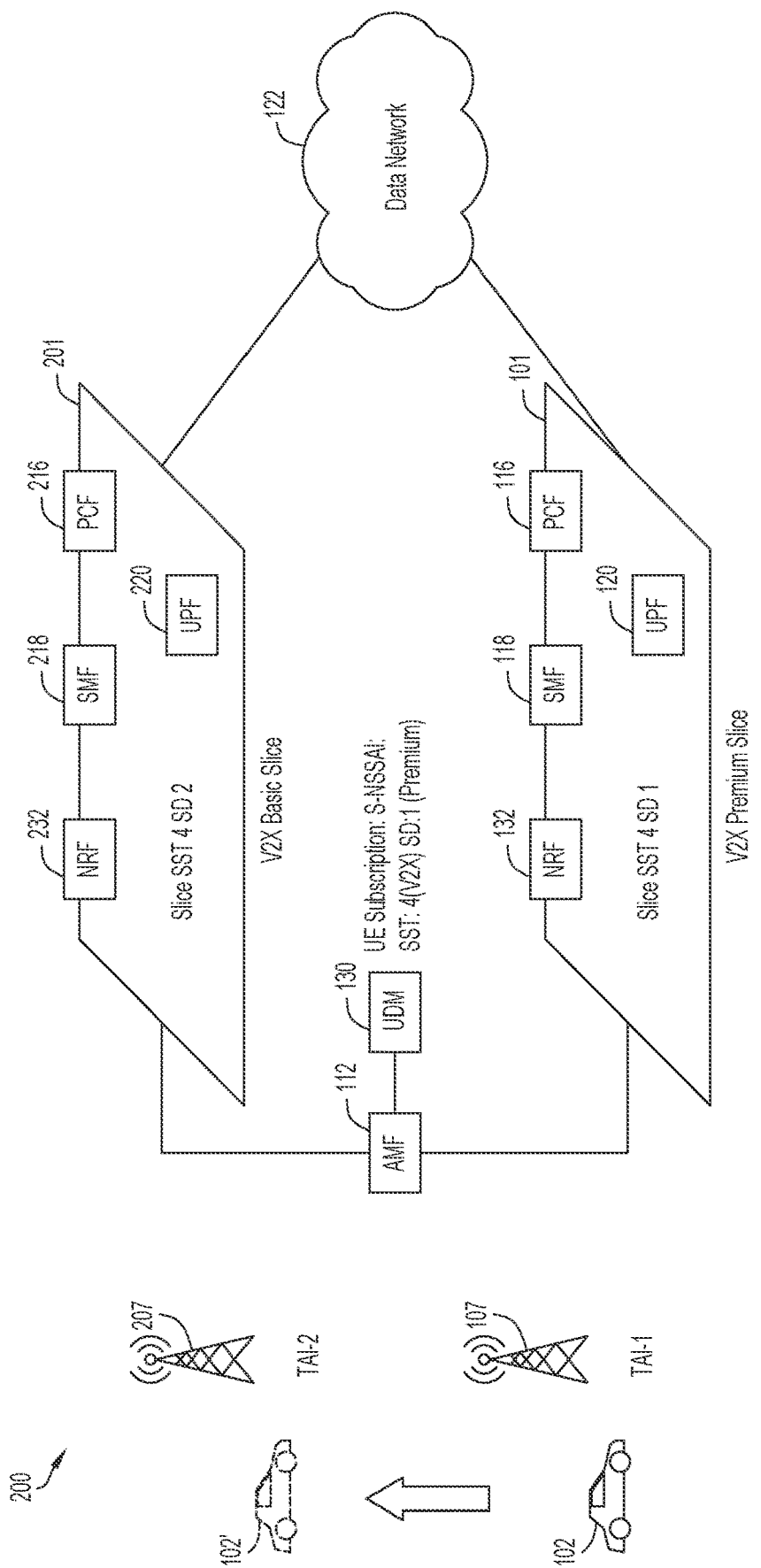
FIG. 2 is an illustrative representation of the network architecture of the 5G network of FIG. 1B in a simplified architectural configuration, where two different network slices are deployed with user equipment (UE) access to a data network.

To better illustrate these deficiencies, FIG. 2 is an illustrative representation of the network architecture of the 5G network of FIG. 1B in a simplified architectural configuration 200, where two different network slices 101 and 201 are deployed with UE access to data network 122.

In the example of FIG. 2, network slices 101 and 201 are deployed for Vehicle-to-Everything or "V2X" service. V2X relates to communication between a vehicle and any entity that may affect or be affected by the vehicle. V2X may involve a vehicular communication system that incorporates other, more specific types of communication, such as Vehicle-to-Infrastructure (V2I), Vehicle-to-Network (V2N), Vehicle-to-Vehicle (V2V), Vehicle-to-Pedestrian (V2P), Vehicle-to-Device (V2D), Vehicle-to-Grid (V2G), etc.

Accordingly, each one of network slices 101 and 201 may be associated with a slice type for V2X (i.e. SST=4). On the other hand, network slices 101 and 201 differ from each other in that network slice 101 may provide a "premium service" for the slice type and network slice 201 may provide a "basic service" for the slice type. In FIG. 2, network slice 101 for the premium service for V2X is shown to include NRF 132, SMF 118, PCF 116, and UPF 120 as in FIG. 1B. On the other hand, network slice 201 for the basic service for V2X is shown to include an NRF 232, an SMF 218, a PCF 216, and UPF 220. AMF 112 and UDM 130 are shown to be common or shared functions of network slices 101 and 201 in the 5G network.

Network slices 101 and 201 may be considered to be "variants" of the slice type. A "variant" of a network slice may have the same slice type of the network slice but a different slice differentiator, which may correspond to a different level of service than that of the network slice. For example, network slice 101 having SST=4 may be associated with an SD=1 (for premium service) and network slice 201 having SST=4 may be associated with an SD=2 (for basic service). Accordingly, network slice 101 for premium service for V2X may be associated with a Slice ID=SST:4 and SD:1, whereas network slice 201 for basic service for V2X may be associated with a Slice ID=SST:4 and SD:2.

In the example of FIG. 2, the slice type for premium service for V2X (e.g. network slice 101) may be provided in a first location (around the bottom of the page) associated with a Tracking Area Identity (TAI) 1, but not made available in a second location (around the top of the page) associated with TAI 2. On the other hand, the slice type for basic service for V2X (e.g. network slice 201) may be provided in both the first and the second locations associated with TAI-1 and TAI-2, respectively.

In a first subscription scenario, a subscriber of UE 102 may subscribe to the premium service for V2X (e.g. Slice ID=SST:4 and SD:1) but not the basic service for V2X (e.g. Slice ID=SST:4 and SD:2). Here, as shown in FIG. 2, UE 102 is associated with a vehicle and may communicate in the 5G network via gNB 107 in the first location associated with the TAI-1. In TAI-1, UE 102 may register in network slice 101 for V2X associated with the premium service. Thereafter, the vehicle may be moved where UE 102 is relocated to the second location associated with the TAI-2 (where UE 102 is now indicated as UE 102') for communication in the 5G network via a gNB 207. As the subscriber is not subscribed to the basic service for V2X, and the premium service for V2X is not available in the second location associated with TAI-2, UE 102' will be without service for V2X service in the second location associated with TAI-2.

In a second subscription scenario, the subscriber may alternatively subscribe to both the premium service (e.g. Slice ID=SST:4 and SD:1) and the basic service for V2X (e.g. Slice ID=SST:4 and SD:2). Again as shown in FIG. 2, UE 102 may communicate in the 5G network via gNB 107 in the first location associated with the TAI-1, and register in network slice 101 for V2X associated with the premium service. Thereafter, the vehicle may be moved where UE 102 is relocated to the second location associated with the TAI-2 (where UE 102 is now indicated as UE 102') for communication in the 5G network via gNB 207. As the premium service for V2X is not made available in the second location associated with TAI-2, but the subscriber is subscribed to the basic service for V2X which is available in the second location, UE 102' may register to receive the basic service for V2X in the second location.

In the second subscription scenario, the subscriber subscribes to all of the variants (e.g. both premium and basic service) just to ensure availability, which is more unlikely than the consumer just subscribing to the single, premium service. Given the consumer's choice in the second subscription scenario and the network limitation of eight (8) S-NSSAIs, UE 102 may not be able to hold subscriptions to other additional needed slice types. Further, as there is a limitation on the size of the URSP as stored in UE 102, a large number of S-NSSAIs may result in a large number of UE policies and, therefore, an undesirable increased size of URSPs.

Figure 3:
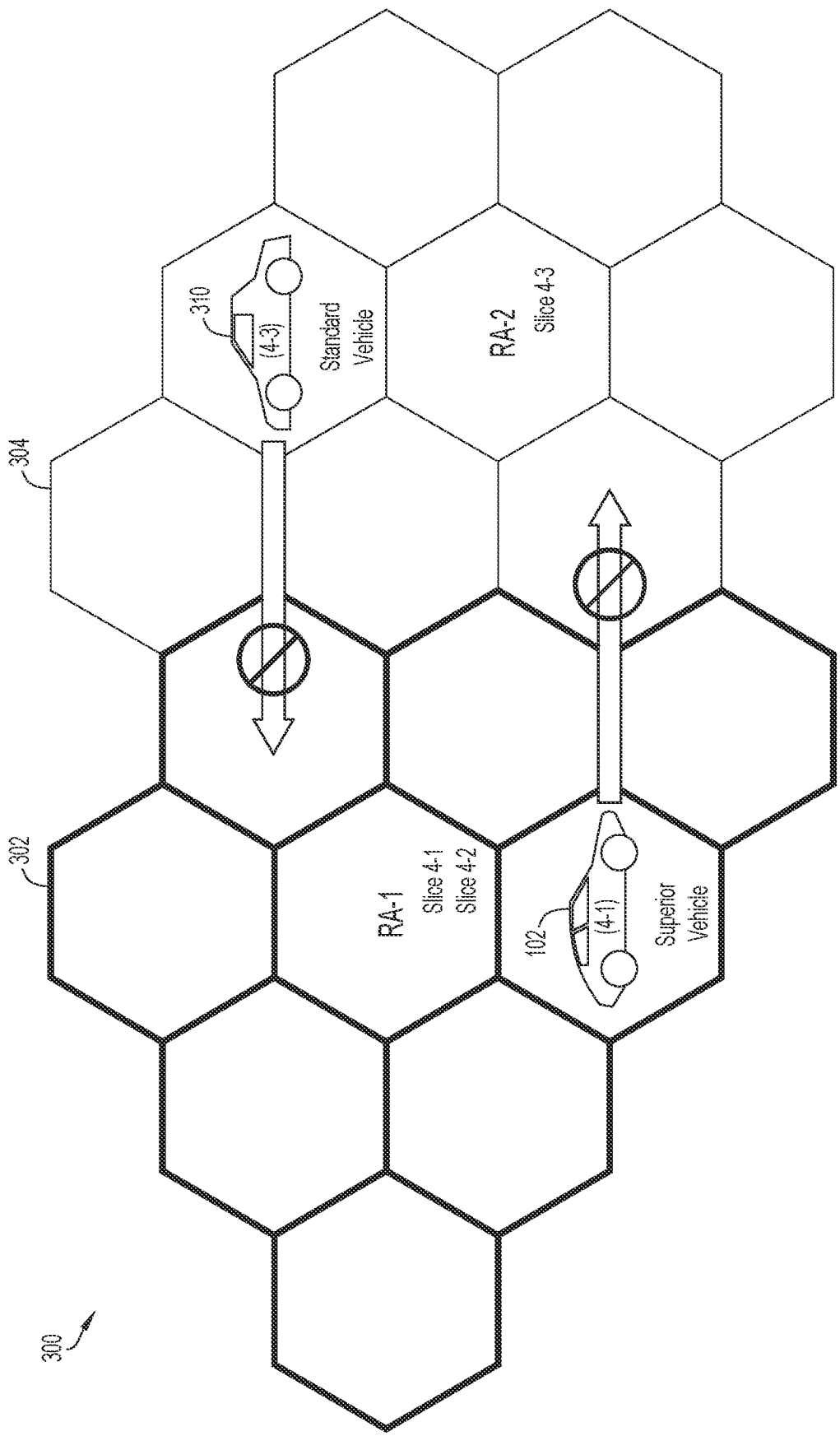
FIG. 3 is an illustrative top down view of a plurality of cells of two different registration areas of a 5G network within which different variants of network slices of the same slice type may be deployed.

To further illustrate these deficiencies, FIG. 3 provides an illustrative top down view of a plurality of cells 300 in two different registration areas 302 and 304 or "RAs" ("RA-1" and "RA-2") of a 5G network in which different variants of network slices of the same slice type may be deployed. In the scenario of FIG. 3, the 5G network may offer three different kinds of network slices: (1) a premium network slice for V2X that is associated with Slice ID=SST:4 and SD:1 (or NSSAI=4-1); (2) a regular network slice for V2X that is associated with SST:4 and SD:2 (or NSSAI=4-2); and (3) a basic network slice for V2X that is associated with SST:4 and SD:3 (or NSSAI=4-3). Here, for easier representation, a slice is identified with use of a shorthand form of "SST-SD," where the SD is indicated as a single digit instead of six (6) digits.

In the example of FIG. 3, the premium network slice for V2X (NSSAI=4-1) and the regular network slice for V2X (NSSAI=4-2) are made available in registration area 302 (i.e. "RA-1"), but not available in registration area 304 (i.e. "RA-2"). On the other hand, the basic network slice for V2X (NSSAI=4-3) is made available in registration area 304 (i.e. RA-2) but not available in registration area 302 (i.e. RA-1).

Also in the example, the subscriber of UE 102 is associated with a "Superior Vehicle" and has a subscription to the premium network slice for V2X (NSSAI=4-1), but not subscriptions to the other network slices. On the other hand, the subscriber of the other UE 310 is associated with a "Standard Vehicle" and has a subscription to the basic network slice for V2X (NSSAI=4-3), but not the other network slices.

On normal days, UE 102 associated with the Superior Vehicle is able to receive service from its subscribed slice 4-1 in registration area 302 (i.e. in RA-1). However, when UE 102 associated with the Superior Vehicle moves to an area where slice 4-1 is unavailable but slice 4-2 or 4-3 is available (i.e. in RA-2), UE 102 associated with the Superior Vehicle will not even receive basic or regular service. Certainly, it would seem to be undesirable for any "premium" subscriber to receive a complete denial of services. Rather, access even to regular or basic services offered by slice 4-2 or 4-3 may be acceptable, for example, until UE 102 associated with the Superior Vehicle moves to a new location (e.g. back to RA-1) where services of slice 4-1 again become available. A similar scenario may exist for the subscriber associated with the Standard Vehicle (i.e. the other UE 310) when traveling between registration areas 302 and 304.

Figure 4A:
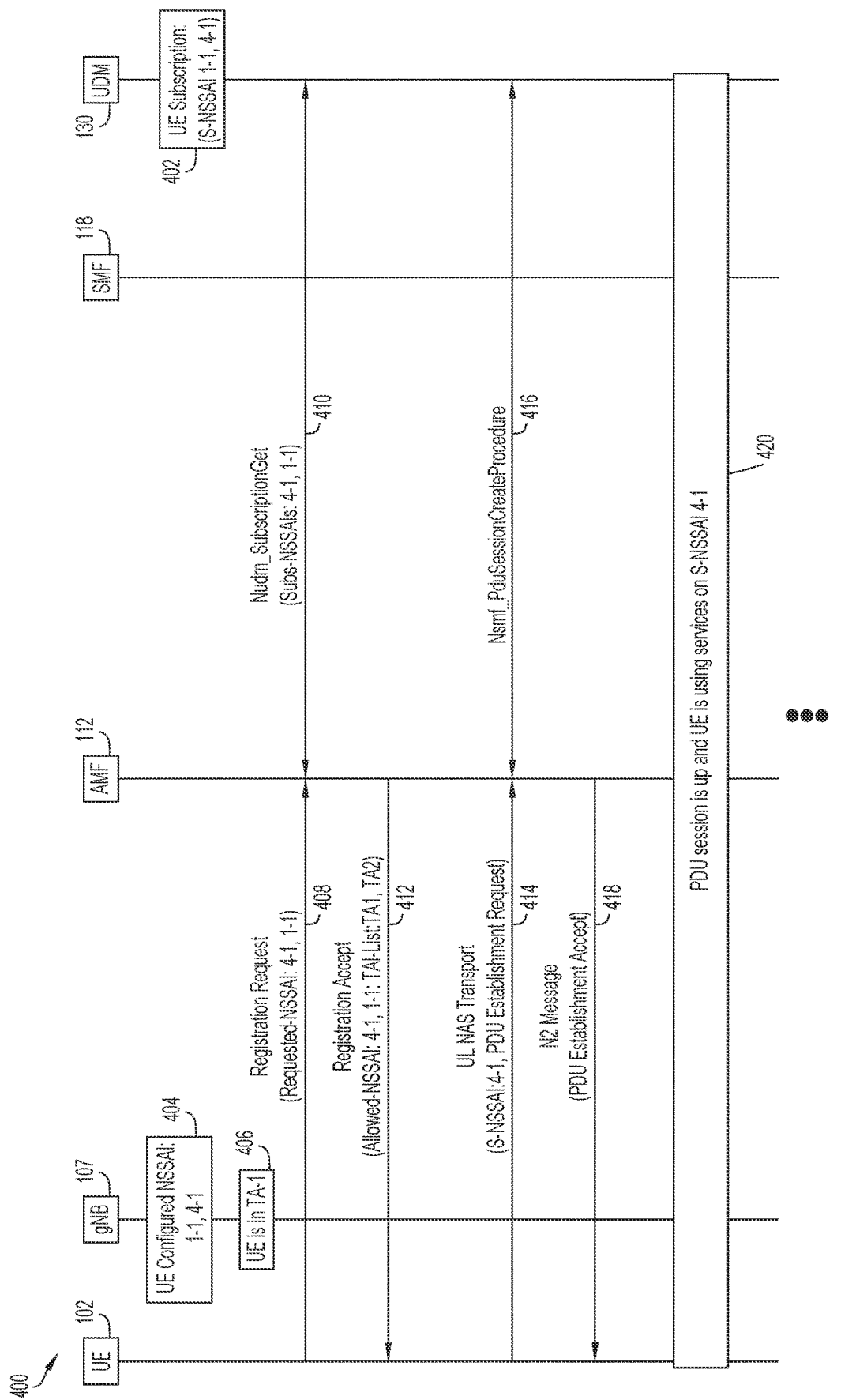
FIGS. 4A and 4B form a call flow diagram of a call flow for describing registration procedures associated with UE attempts to register to a network slice in different locations according to conventional operation.
Figure 4B:
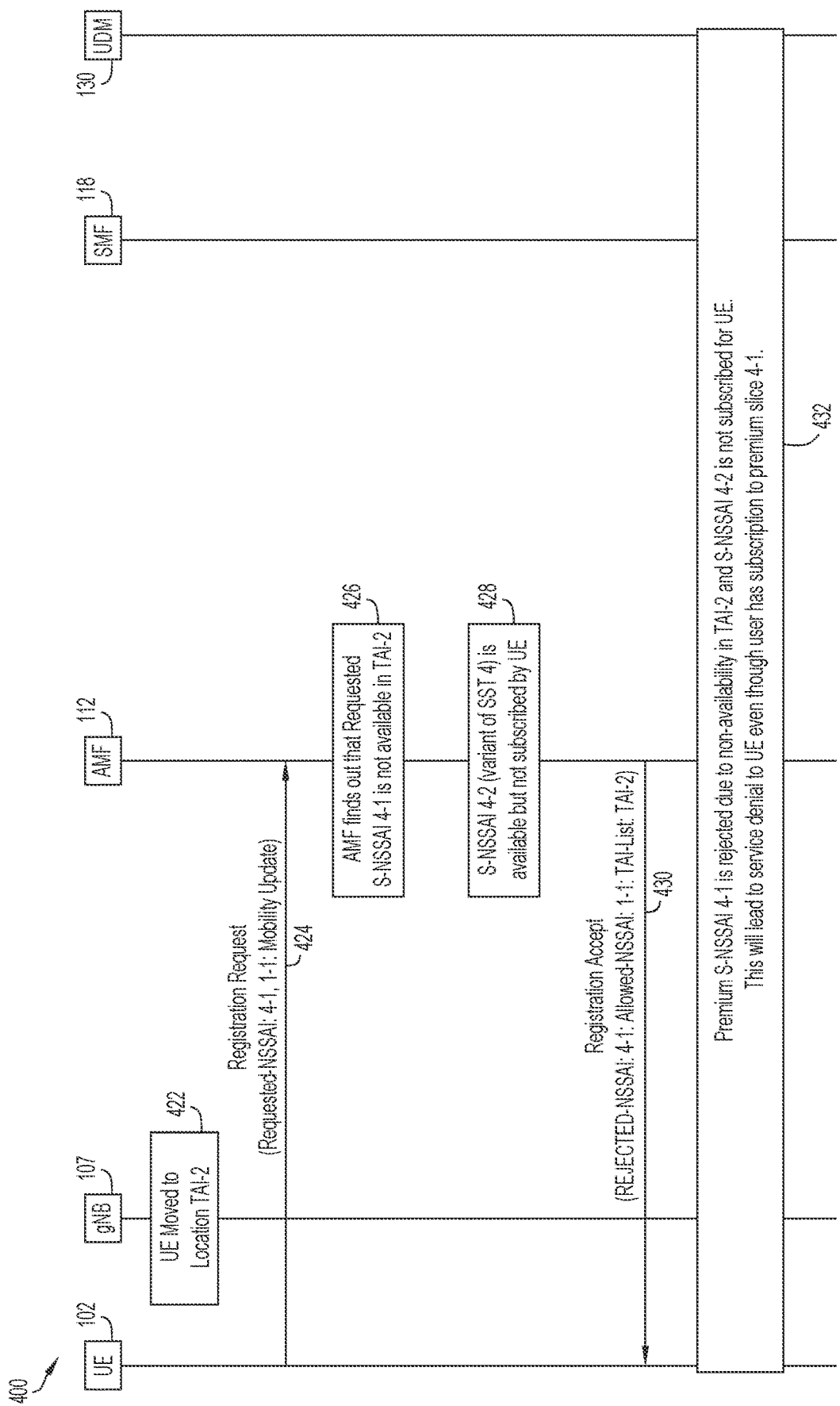

To help further explain, FIGS. 4A-4B provide a call flow diagram 400 of a call flow for describing registration procedures associated with attempts to register to a network slice in different locations of a 5G network according to conventional operation.

In the example of FIGS. 4A-4B, the 5G network may deploy a premium network slice for V2X (NSSAI=4-1) in a first location (e.g. TAI-1) but not in a second location (e.g. TAI-2). On the other hand, the 5G network may deploy a basic network slice for V2X (NSSAI=4-2) in both the first and the second locations (e.g. TAI-1 and TAI-2, respectively). Further, the 5G network may deploy a regular network slice for eMBB (NSSAI=1-1) in both the first and the second locations (e.g. TAI-1 and TAI-2, respectively).

In a preliminary step 402 of FIG. 4A, a subscription for the regular network slice for eMBB (NSSAI=1-1) and the premium network slice for V2X (NSSAI=4-1) is obtained for UE 102; however, UE 102 does not have a subscription for the regular network slice for V2X (NSSAI=4-2). In a preliminary step 404 of FIG. 4A, UE 102 is configured with Configured NSSAIs which include NSSAI=1-1 and NSSAI=4-1.

UE 102 may be associated with a vehicle and operate in the first location (i.e. TAI-1) for communication in the 5G network via gNB 107 (step 406 of FIG. 4A). In the first location, UE 102 may send to AMF 112 a message which indicates a registration request (step 408 of FIG. 4A). The message which indicates the registration request may include Requested NSSAIs which are, in this example, NSSAI=1-1 and NSSAI=4-1. AMF 112 may receive and process the message, and send to UDM 130 a message for obtaining subscription information associated with UE 102 (e.g. via the SBI, using Nudm_SubscriptionGet or other) (step 410 of FIG. 4A). UDM 130 may provide AMF 112 with the subscription information that includes Subscribed NSSAIs associated with UE 102. In this case, the subscription information for UE 102 includes NSSAI=1-1 and NSSAI=4-1. The AMF 112 may store and process the subscription information of UE 102, which may include a comparison and verification of NSSAIs. In response, AMF 112 may send to UE 102 a message which indicates a registration accept including Allowed NSSAIs and a TAI List of location areas (step 412 of FIG. 4A). In this case, the Allowed NSSAIs include NSSAI=1-1 and NSSAI=4-1, and the TAI List includes TA-1 and TA-2.

UE 102 may send to AMF 112 a message which may be an uplink (UL) non-access stratum (NAS) transport message, which includes a message indicating a PDU establishment request (step 414 of FIG. 4A). This message may include an S-NSSAI which, in this case, includes S-NSSAI=4-1. AMF 112 may receive and process the message, and send to SMF 118 a message which indicates a PDU session create procedure request (e.g. via the SBI, using Nsmf_PduSessionCreateProcedure or other) (step 416 of FIG. 4A). SMF 118 may receive and process the message, for creating a session with the appropriate UPF associated with the S-NSSAI. AMF 112 may then send to UE 102 an N2 message which indicates a PDU establishment accept (step 418 of FIG. 4A). Thus, a PDU session is established such that UE 102 may utilizes services in the network slice (i.e. for the premium network slice for V2X or NSSAI=4-1) (step 420 of FIG. 4A).

Continuing with the call flow diagram 400 in FIG. 4B, the vehicle of UE 102 is moved such that UE 102 is relocated to the second location associated with the TAI-2 (step 422 of FIG. 4B). In the second location, UE 102 may send to AMF 112 a message which indicates a registration request (step 424 of FIG. 4B). The message may be part of a mobility update to the network. The message which indicates the registration request may include Requested NSSAIs which are, again in this example, NSSAI=1-1 and NSSAI=4-1. AMF 112 may receive and process the message, which may include a comparison and verification of NSSAIs.

Here, AMF 112 may identify that the NSSAI=4-1 is not available in the second location associated with TAI-2 (step 426 of FIG. 4B). The variant of NSSAI=4-1 (i.e. the basic network slice for V2X or NSSAI=4-2) is indeed available in the second location associated with TAI-2, but it is not subscribed to by UE 102 (step 428 of FIG. 4B). AMF 112 may send to UE 102 a message which indicates a registration accept including a Rejected NSSAI, Allowed NSSAIs, and a TAI List of location areas (step 430 of FIG. 4B). In this case, the Rejected NSSAI may include the NSSAI=4-1, the Allowed NSSAI may include the NSSAI=1-1, and the TAI List may include TAI-2.

As is apparent from the above, the premium network slice for V2X (i.e. NSSAI=4-1) is rejected due to its unavailability in the second location associated with TAI-2, and UE 102 does not register in the basic network slice for V2X (i.e. NSSAI=4-2) because UE 102 has no subscription for it (step 432 of FIG. 4B). This leads to a complete service denial for V2X, even though UE 102 has a subscription to premium services.

Accordingly, it may be desirable to ensure that a subscriber of a network slice of a given slice type for a first level of service (e.g. a premium service or "Gold" service) may obtain registration in an alternative network slice of the given slice type for a second level of service (e.g. a basic service or "Silver" service) when the slice type associated with first level of service is unavailable (e.g. in a particular location). The above operation would be especially desirable if it were implemented without consuming additional subscriptions or slots associated with additional NSSAIs.

Techniques and mechanisms are described herein for a registration procedure for ensuring service based on a selection of a best available (or alternative) network slice of the same slice type, where different levels of services are provided for the slice type. In some implementations, what is proposed is a solution where a UE may subscribe to multiple variants of a slice type with different levels of service (e.g. Gold, Silver, and Bronze services). The UE may perform registration with use of a slice ID associated with a level of service, and the network will select the network slice associated with the slice ID, unless the slice type associated with the level of service is unavailable, in which case the network will then select a best available or alternative network slice of the same slice type associated with a different level of service. Thus, additional network slices over the current limitation of eight (8) may be utilized by a UE without adding slots for additional NSSAIs.

Figure 5:
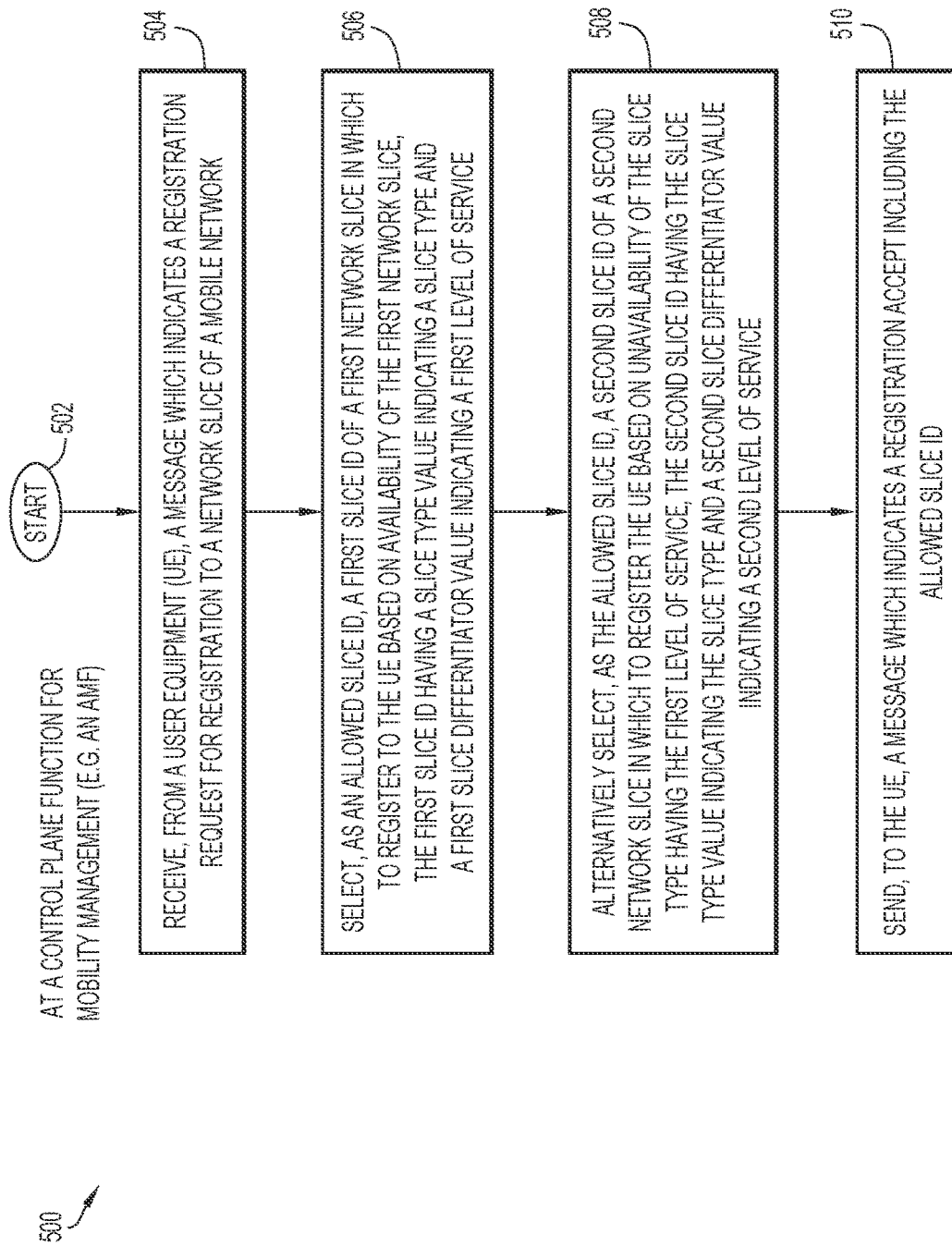
FIG. 5 is a flowchart for describing a registration procedure for ensuring service based on a selection of a best available (or alternative) network slice of the same slice type according to some implementations of the present disclosure, where different levels of services may be provided for the slice type.

FIG. 5 is a flowchart 500 for describing a registration procedure for ensuring service based on a selection of a best available (or alternative) network slice of the same slice type according to some implementations of the present disclosure, where different levels of services may be provided for the slice type. In some implementations, a "variant" of a network slice has the same slice type of the network slice but a different slice differentiator, which may correspond to a different level of service. The method may be performed by a control plane function, such as a control plane function for mobility management (e.g. an AMF). The method may be embodied in a computer program product which includes a non-transitory computer readable medium and instructions stored in the non-transitory computer readable medium, where the instructions are executable by one or more processors of a network node having the control plane function (e.g. a control plane function node for mobility management, such as an AMF node).

Beginning at a start block 502 of FIG. 5, the control plane function may receive, from a UE, a message which indicates a registration request for registration to a network slice of a mobile network (step 504 of FIG. 5). The control plane function may select, as an allowed slice ID, a first slice ID of a first network slice in which to register the UE based on the availability of the first network slice (step 506 of FIG. 5). The first slice ID may have a slice type value indicating a slice type and a first slice differentiator value associated with a first level of service. On the other hand, the control plane function may alternatively select, as the allowed slice ID, a second slice ID of a second network slice in which to register the UE based on unavailability of the slice type associated with the first level of service (step 508 of FIG. 5). The second slice ID may have the slice type value indicating the slice type and a second slice differentiator value associated with a second level of service. The control plane function may send, to the UE, a message which indicates a registration accept including the allowed slice ID (step 510 of FIG. 5).

Accordingly, a UE may be provided with the best available or alternative level of service for the requested slice type. In some implementations, the first level of service may be a higher level of service than the second level of service. For example, the first level of service may be a premium service (e.g. Gold service) and the second level of service may be a basic service (e.g. Silver service). In other implementations, the first level of service may include one or more services that are unavailable in the second level of service. In yet other implementations, the first level of service may involve an allocation or reservation of resources (e.g. bandwidth or throughput, Quality of Service or "QoS" level, etc.) according to one or more service parameters that are not provided in the second level of service. In further implementations, the first and the second level of services may be characterized by one or more combinations of the above. In some implementations, three or more service levels or variants of a network slice may be provided. In some implementations, the network slices may be associated with slice types including eMBB, URLLC, mMTC, and others.

In some implementations, the first network slice is available in a first location and unavailable in a second location, and the second network slice is available in both the first and the second locations. Here, in step 506, selecting, as the allowed slice ID, the first slice ID of the first network slice may be performed when the UE is identified to operate in the first location. In step 508, alternatively selecting, as the allowed slice ID, the second slice ID of the second network slice may be performed when the UE is identified to operate in the second location. In some implementations, location may be defined by tracking area or registration area.

In some implementations, the control plane function may obtain subscription information associated with the UE (e.g. from storage or a database, or UDM). The control plane function may verify and/or select the network slice in which to register the UE based on the subscription information. The subscription information may include a subscribed slice ID having the slice type value. In further implementations, the subscription information may further include a subscription indicator (or subscription attribute) which indicates a requirement or preference for registration to a network slice having a best available (or alternative) level of service for the slice type indicated by the slice type value. For example, the subscription indicator may be a bit indicator, which may be named "Enable Variant," where 0=Disabled and 1=Enabled. The subscription indicator or attribute may be provided on a per-slice ID basis for each one of a plurality of subscribers.

In some implementations, the message which indicates the registration request for registration in step 504 may include a requested network slice ID which may be the first slice ID of the first network slice. Here, in step 508, the control plane function may examine the subscription indicator to identify whether variant selection may be performed in response to identifying unavailability of the slice type having the first level of service. If variant selection is not enabled (or disabled), then variant selection will not be performed for the network slice of the subscriber.

In one example associated with the subscription indicator, the 5G network may offer a premium service for a given slice type (e.g. Slice ID=SST:4 and SD:1) and a basic service for the slice type (e.g. Slice ID=SST:4 and SD:2), and the UE may be subscribed to the premium service for the slice type with variant selection. Here, the subscription indicator may be used to trigger the variant selection for the UE (e.g. select the best available slice for the slice type, which is basic service when premium service for the slice type is unavailable).

In some implementations, the message which indicates the registration request for registration includes a requested network slice ID which may be a wildcard slice ID. The wildcard slice ID may have the slice type value and a wildcard slice differentiator value which indicates a requirement or preference for registration to a network slice having a best available (or alternative) level of service for the slice type. In some implementations, the control plane function may examine a subscription indicator (per the above-described technique) to confirm whether variant selection should be performed in response identifying the wildcard slice ID. In other implementations, in response to identification of the wildcard slice ID, the control plane function may perform variant selection without any need to further examine any such subscription indicator.

In one example associated with the wildcard slice ID, the 5G network may offer a premium service for a given slice type (e.g. Slice ID=SST:4 and SD:1) and a basic service for the slice type (e.g. Slice ID=SST:4 and SD:2), where a particular wildcard slice ID (e.g. Slice ID=SST:4 and SD:99) may be used to trigger variant selection for the UE (e.g. select the best available slice from Slice ID=SST:4 and SD:1 and Slice ID=SST:4 and SD:2).

In some implementations, the control plane function may cause charging information to be communicated to a charging function after UE registration, where the charging information is indicative of charging according to one of the first level of service of the first network slice that is selected for registration or the second level of service of the second network slice that is selected for registration.

Figure 6A:
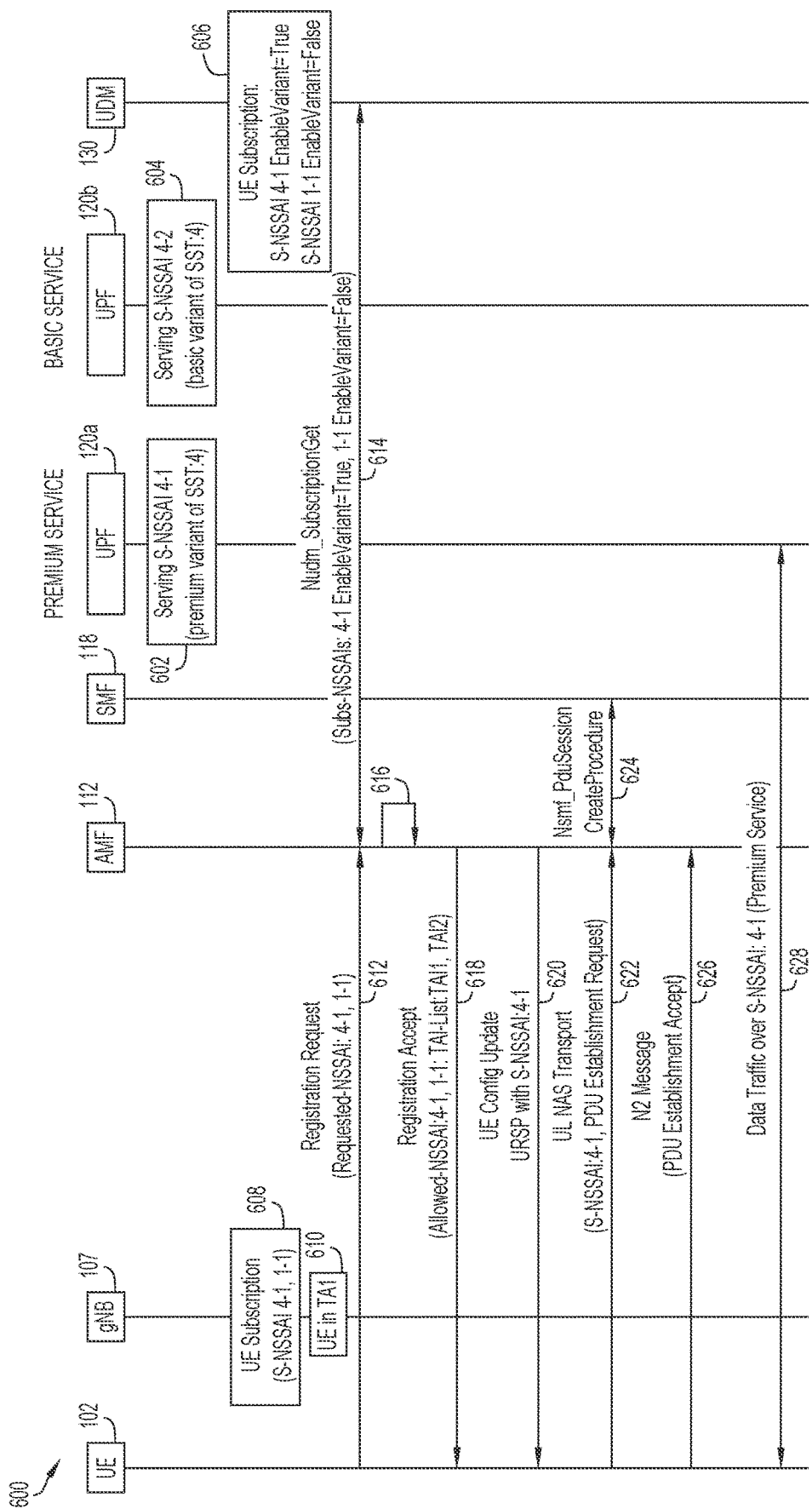
Figure 6C:
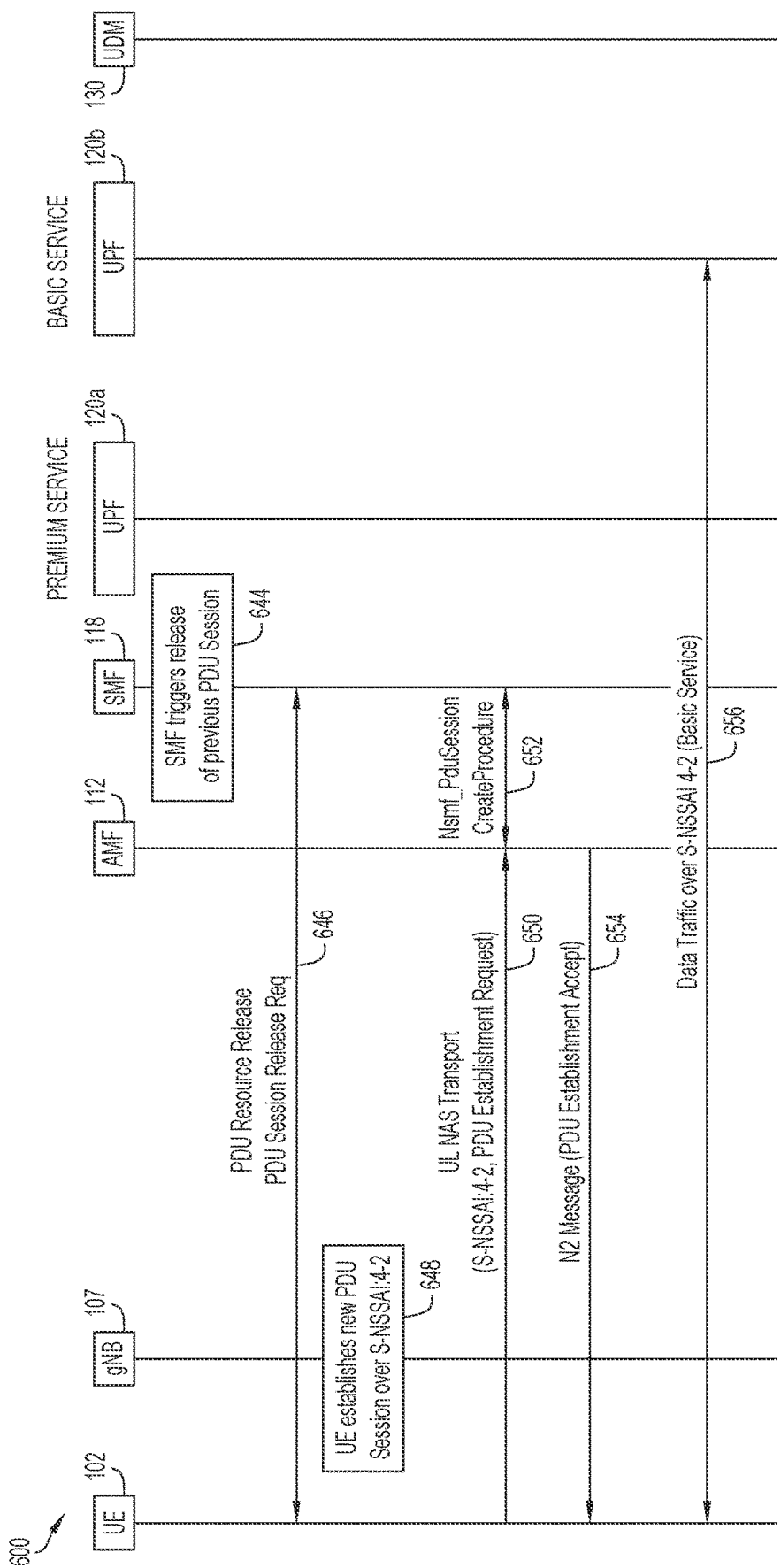

FIGS. 6A, 6B and 6C form a call flow diagram 600 of a call flow for describing registration procedures for ensuring service based on the selection of a best available (or alternative) network slice of the same slice type according to some implementations of the present disclosure, where different levels of services may be provided for the slice type.

In the example of FIGS. 6A-6C, the 5G network may deploy a premium network slice for V2X (i.e. NSSAI=4-1) for premium services in first and second locations (e.g. TAI-1 and TAI-2, respectively), and a basic network slice for V2X (i.e. NSSAI=4-2) for basic services in a third location (e.g. TAI-3). The 5G network may further deploy a basic network slice for eMBB (i.e. NSSAI=1-1) in first, second, and third locations (e.g. TAI-1, TAI-2, and TAI-3, respectively).

In a preliminary step 602 of FIG. 6A, a UPF 120*a* is indicated as serving in the premium network slice for V2X (i.e. NSAAI=4-1). In a preliminary step 604 of FIG. 6A, a UPF 120*b* is indicated as serving in the basic network slice for V2X (i.e. NSAAI=4-2).

In a preliminary step 606 of FIG. 6A, a subscriber of UE 102 obtains a subscription for the premium network slice for V2X (i.e. NSSAI=4-1) and for the regular network slice for eMBB (NSSAI=1-1). In the subscription for the premium network slice for V2X (i.e. NSSAI=4-1), a subscription indicator is set to indicate a requirement or preference for registration to a network slice having a best available (or alternative) level of service for the slice type (e.g. Enable Variant=True=Enabled). For the basic network slice for eMBB (i.e. NSSAI=1-1), the subscription indicator is set to indicate no requirement or preference for registration to a network slice having a best available (or alternative) level of service for the slice type (e.g. Enable Variant=False=Disabled). In a preliminary step 608 of FIG. 6A, UE 102 is configured with Configured NSSAIs which include NSSAI=4-1 and NSSAI=1-1.

UE 102 may be associated with a vehicle and operate in the first location (i.e. TAI-1) for communication in the 5G network via gNB 107 (step 610 of FIG. 6A). In the first location, UE 102 may send to AMF 112 a message which indicates a registration request (step 612 of FIG. 6A). The message which indicates the registration request may include Requested NSSAIs which are, in this example, NSSAI=4-1 and NSSAI=1-1. AMF 112 may receive and process the message, and send to UDM 130 a message for obtaining subscription information associated with UE 102 (e.g. via the SBI, using Nudm_SubscriptionGet or other) (step 614 of FIG. 6A).

UDM 130 may provide AMF 112 with the subscription information that includes Subscribed NSSAIs and their associated subscription indicators. In this case, the subscription information for UE 102 includes NSSAI=1-1 (Enable Variant=Disabled) and NSSAI=4-1 (Enable Variant=Enabled). AMF 112 may store and process the subscription information of UE 102 (step 616 of FIG. 6A), which may include a comparison and verification of NSSAIs. In response, AMF 112 may send to UE 102 a message which indicates a registration accept including Allowed NSSAIs and a TAI List of location areas (step 618 of FIG. 6A). In this case, the Allowed NSSAIs include NSSAI=4-1 and NSSAI=1-1, and the TAI List includes TA-1 and TA-2. AMF 112 may also send to UE 102 a message which indicates a UE configuration update and includes a URSP associated with S-NSSAI=4-1 (step 620 of FIG. 6A).

Then, UE 102 may send to AMF 112 a message which may be UL NAS transport message, which includes a message indicating a PDU establishment request (step 622 of FIG. 6A). This message may include an S-NSSAI which, in this case, includes S-NSSAI=4-1. AMF 112 may receive and process the message, and send to SMF 118 a message which indicates a PDU session create procedure request (e.g. via the SBI, using Nsmf_PduSessionCreateProcedure or other) (step 624 of FIG. 6A). SMF 118 may receive and process the message, for creating a session with the appropriate UPF associated with the S-NSSAI (i.e. UPF 120a for premium service). AMF 112 may then send to UE 102 an N2 message which indicates a PDU establishment accept (step 626 of FIG. 6A). Thus, a PDU session is established for data traffic via UPF 120a such that UE 102 may utilize premium services in the network slice (i.e. the premium network slice for V2X or NSSAI=4-1) (step 628 of FIG. 6A). For this service, charging information may be communicated to a charging function, where the charging information is indicative of charging according to the premium service associated with the premium network slice that is selected for registration.

Continuing with the call flow diagram 600 in FIG. 6B, the vehicle of UE 102 is moved such that UE 102 is relocated to the third location associated with the TAI-3 (step 630 of FIG. 6B). In the third location, UE 102 may send to AMF 112 a message which indicates a registration request (step 632 of FIG. 6B). The message may be part of a mobility update to the network. The message which indicates the registration request may include Requested NSSAIs which are, again in this example, NSSAI=4-1 and NSSAI=1-1. AMF 112 may receive and process the message (step 634 of FIG. 6B), which may include a comparison and verification of NSSAIs.

Here, AMF 112 may identify that the NSSAI=4-1 associated with the premium network slice for V2X is unavailable in the third location associated with TAI-3 (step 636 of FIG. 6B). However, the basic network slice for V2X associated with NSSAI=4-2 is available in the third location associated with TAI-3. AMF 112 may examine the subscription indicator which indicates the requirement or preference for registration to a network slice having a best available (or alternative) level of service for the slice type (e.g. Enable Variant=True=Enabled). In response, AMF 112 will not select nor indicate rejection of the unavailable premium network slice, but rather alternatively select the basic network slice for V2X (i.e. NSSAI=4-1) as the best available or alternative (step 638 of FIG. 6B). AMF 112 may then send to UE' a message which indicates a registration accept including Allowed NSSAIs and a TAI List of location areas (step 640 of FIG. 6B). In this case, the Allowed NSSAIs may include the NSSAI=4-2 and NSSAI=1-1, and the TAI List may include TAI-3. AMF 112 may also send to UE 102 a message which indicates a UE configuration update and includes an updated URSP associated with S-NSSAI=4-2 (step 642 of FIG. 6B).

Continuing with the call flow diagram 600 in FIG. 6C, SMF 118 may trigger a release of the current PDU session (step 644 of FIG. 6C) which causes a procedure for a PDU resource release to be performed (step 646 of FIG. 6C). UE 102 may then establish a new PDU session over the basic network slice for V2X associated with NSSAI=4-2 (step 648 of FIG. 6C). UE 102 may send to AMF 112 a message which may be UL NAS transport message, which includes a message indicating a PDU establishment request (step 650 of FIG. 6C). This message may include an S-NSSAI which, in this case, includes S-NSSAI=4-2. AMF 112 may receive and process the message, and send to SMF 118 a message which indicates a PDU session create procedure request (e.g. via the SBI, using Nsmf_PduSessionCreateProcedure or other) (step 652 of FIG. 6C). SMF 118 may receive and process the message, for creating a session with the appropriate UPF associated with the S-NSSAI=4-2 (i.e. UPF 120b for basic service). AMF 112 may then send to UE 102 an N2 message which indicates a PDU establishment accept (step 654 of FIG. 6C). Thus, a PDU session is established for data traffic via UPF 120b such that UE 102 may utilize basic services in the network slice (i.e. the basic network slice for V2X or NSSAI=4-2) (step 656 of FIG. 6C). For this service, charging information may be communicated to the charging function, where the charging information is indicative of charging according to the basic service associated with the basic network slice that is (actually) selected for registration.

To further illustrate the techniques and mechanisms of the present disclosure, an example of a UE being "subscribed to" more than eight (8) network slices despite the current 3GPP standards limitation of eight (8) S-NSSAIs is now given. In this example, the UE has a subscription for eight (8) network slices as follows:

1. V2X (SST=4, SD=1), where the operator offers two (2) variants, SD=1 for premium vehicles and SD=2 for regular vehicles;
2. eMBB (SST=1, SD=1), where the operator offers three (3) variants, SD=1 for Gold, SD=2 for Silver, and SD=3 for Bronze;
3. Gaming (SST=65, SD=1)
4. URLLC (SST=2, SD=1)
5. Medical (SST=66, SD=1)
6. MIoT (SST=3, SD=1)
7. Augmented Reality/Virtual Reality (ARVR) (SST=67, SD=1)
8. Slice8 (SST=68, SD=1)

As is apparent, the above subscriptions associated with the UE fills all of the possible slots of the S-NSSAI for the UE. When allowing a variant or wildcard based subscription, however, the UE may be actually subscribed to more than eight (8) network slices: specifically in this example, eleven (11) S-NSSAIs, two (2) for V2X and three (3) for eMBB.

Network slicing is one of the key architectural changes in 5G. In a 5G network, a UE operates to request access to a network slice by sending a slice ID (i.e. a S-NSSAI) to the 5GC. Currently, only eight (8) network slices may be requested by the UE, as there is a cost associated with every slice to which the UE attaches. In some implementations, what is proposed is a solution where multiple variants of a given slice type may be offered to a subscriber of a UE with little or no changes in the UE. Accordingly, a subscriber of a UE is still able to subscribe to various network-based services, and the network will ensure that these services are provided to the UE, to the best of its ability, according to subscription and location of the UE.

Thus, techniques and mechanisms have been described for a registration procedure for ensuring service for a UE based on a selection of a best available or alternative network slice of the same slice type, where different levels of services may be provided for the slice type. In one illustrative example, a method may be performed at a control plane function for mobility management (e.g. an AMF) which involves receiving, from a user equipment (UE), a message which indicates a registration request for registration to a network slice of a mobile network; selecting, as an allowed slice ID, a first slice ID of a first network slice in which to register the UE based on availability of the first network slice, where the first slice ID having a slice type value indicates a slice type and a first slice differentiator value associated with a first level of service; alternatively selecting, as the allowed slice ID, a second slice ID of a second network slice in which to register the UE based on unavailability of the slice type associated with the first level of service, where the second slice ID has the slice type value indicating the slice type and a second slice differentiator value associated with a second level of service; and sending, to the UE, a message which indicates a registration accept including the allowed slice ID.

In some implementations, the method may further involve obtaining subscription information associated with the UE, where the subscription information includes a subscribed slice ID having the slice type value, and further includes a subscription indicator which indicates a requirement or preference for registration to a network slice having a best available or alternative level of service for the slice type indicated by the slice type value. Here, in some implementations, the message which indicates the registration request for registration includes a requested network slice ID comprising the first slice ID.

In some implementations, the message which indicates the registration request for registration includes a requested network slice ID comprising a wildcard slice ID, where the wildcard slice ID has the slice type value and a wildcard slice differentiator value indicating a requirement or preference for registration to a network slice having a best available or alternative level of service for the slice type indicated by the slice type value.

In some implementations, the first level of service is a higher level of service than the second level of service, or includes one or more services that are unavailable in the second level of service, or provides an allocation or reservation of resources according to one or more service parameters that are not provided in the second level of service.

In some implementations, the first network slice is available in a first location and unavailable in a second location, whereas the second network slice is available in both the first and the second locations. Here, the method may further involve selecting, as the allowed slice ID, the first slice ID of the first network slice is performed when the UE is identified to operate in the first location, and alternatively selecting, as the allowed slice ID, the second slice ID of the second network slice is performed when the UE is identified to operate in the second location.

In some implementations, the method may further involve causing charging information to be communicated to a charging function, where the charging information is indicative of charging according to one of the first level of service of the first network slice that is selected for registration or the second level of service of the second network slice that is alternatively selected for registration.

In another illustrative example, a network node of the present disclosure may comprise one or more processors; one or more interfaces to connect in a mobile network; and one or more memory elements for storing instructions executable by the one or more processors for operation as a control plane function for mobility management, and for performing the methods described herein.

In yet another illustrative example, a computer program product of the present disclosure may comprise a non-transitory computer readable medium and instructions in the non-transitory computer readable medium, where the instructions are executable by one or more processors of a control plane function for mobility management, and for performing the methods described herein.

Figure 7:
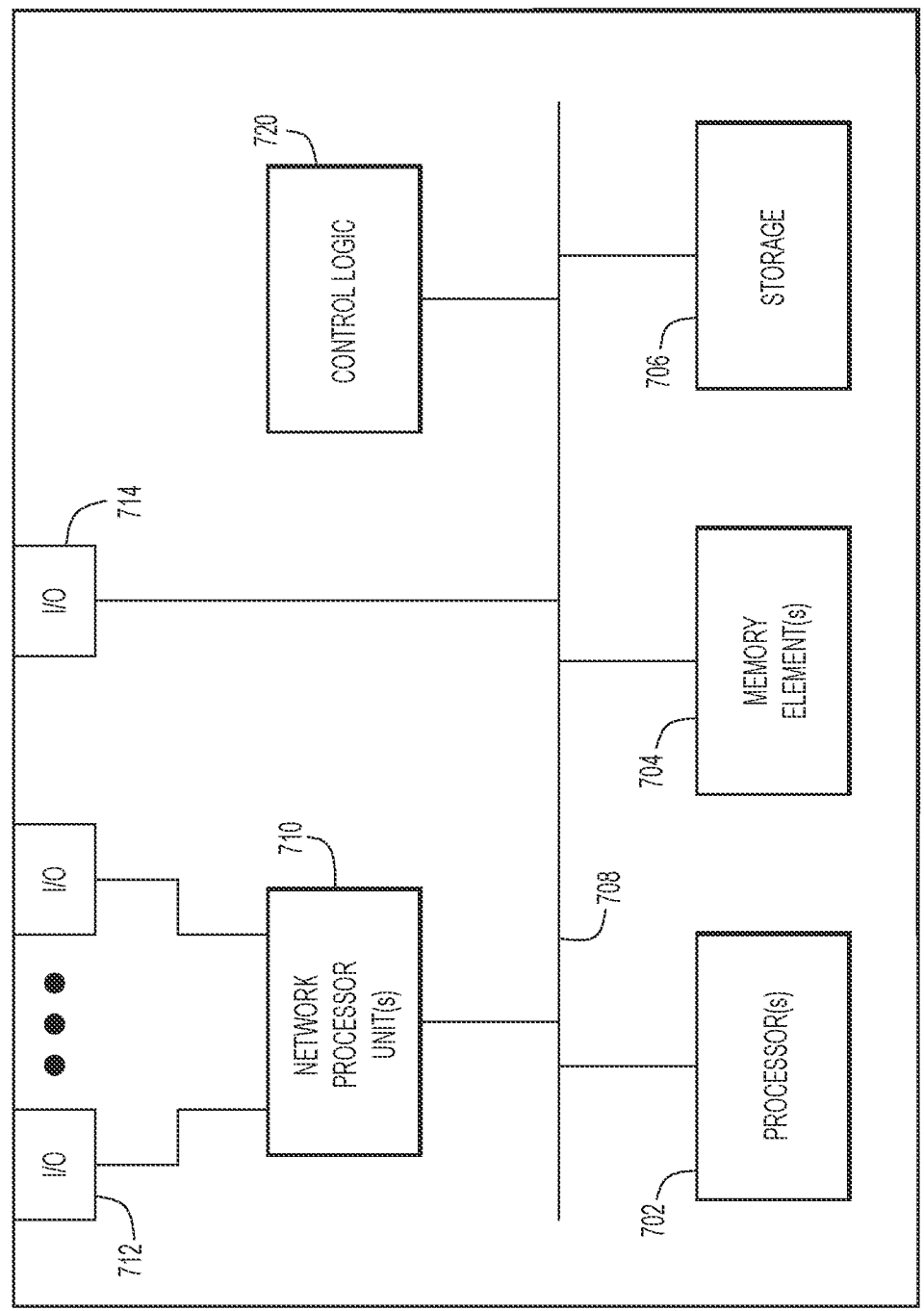
FIG. 7 illustrates a hardware block diagram of a computing device that may perform functions associated with operations of a control plane function (e.g. a control plane function for mobility management) according to some implementations of the present disclosure.

FIG. 7 illustrates a hardware block diagram of a computing device 700 that may perform functions associated with operations discussed herein in connection with the techniques described in relation to the above figures. In various embodiments, a computing device, such as computing device 700 or any combination of computing devices 700, may be configured as any entity/entities as discussed for the techniques depicted in connection with the figures in order to perform operations of the various techniques discussed herein. In particular, computing device 700 may perform operations of a control plane function for mobility management (e.g. an AMF, etc.) for operation in accordance with the method of FIG. 5, and/or may perform operations according to any one of the call flows of FIGS. 6A-6C (e.g. in the environments described in relation to FIGS. 1A-1B, 2, and 3).

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, IoT network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at a control plane function for mobility management,
receiving, from a user equipment (UE), a message which indicates a registration request for registration to a network slice of a mobile network;
obtaining subscription information associated with the UE, the subscription information including a subscribed slice ID having a slice type value indicating a slice type and having a subscription attribute indicating whether a requirement or preference for registration to a network slice having a best available or alternative level of service for the slice type indicated by the slice type value is enabled or disabled for the UE;
selecting, as an allowed slice ID, a first slice ID of a first network slice in which to register the UE based on availability of the first network slice, the first slice ID having the slice type value indicating the slice type and having a first slice differentiator value associated with a first level of service;
based on unavailability of the slice type having the first slice differentiator value associated with the first level of service and based on the subscription attribute indicating the requirement or preference for registration to a network slice having a best available or alternative level of service for the slice type indicated by the slice type value is enabled, alternatively selecting, as the allowed slice ID, a second slice ID of a second network slice in which to register the UE, the second slice ID having the slice type value indicating the slice type and having a second slice differentiator value associated with a second level of service; and
sending, to the UE, a message which indicates a registration accept including the allowed slice ID.

2. The method of claim 1, wherein the message which indicates the registration request for registration includes a requested network slice ID comprising the first slice ID.

3. The method of claim 1, wherein the message which indicates the registration request for registration includes a requested network slice ID comprising a wildcard slice ID, the wildcard slice ID having the slice type value and a wildcard slice differentiator value that is associated with the subscription attribute indicating the requirement or preference for registration to a network slice having a best available or alternative level of service for the slice type indicated by the slice type value.

4. The method of claim 1, wherein the first level of service comprises:
a higher level of service than the second level of service,
one or more services that are unavailable in the second level of service, or
an allocation or reservation of resources according to one or more service parameters that are not provided in the second level of service.

5. The method of claim 1, wherein the first network slice is available in a first location and unavailable in a second location, and the second network slice is available in the first location and the second location, and wherein:
selecting, as the allowed slice ID, the first slice ID of the first network slice is performed when the UE is identified to operate in the first location, and
alternatively selecting, as the allowed slice ID, the second slice ID of the second network slice is performed when the UE is identified to operate in the second location.

6. The method of claim 1, further comprising:
at the control plane function for mobility management,
causing charging information to be communicated to a charging function, the charging information being indicative of charging according to one of the first level of service of the first network slice that is selected for registration or the second level of service of the second network slice that is alternatively selected for registration.

7. The method of claim 1, wherein the control plane function for mobility management comprises an access and mobility management function (AMF).

8. The method of claim 1, wherein the first level of service is a higher level of service than the second level of service for the slice type.

9. A network node comprising:
one or more processors;
one or more interfaces to connect in a mobile network; and
one or more memory elements for storing instructions executable by the one or more processors for operation as a control plane function for mobility management, including for:
receiving, from a user equipment (UE), a message which indicates a registration request for registration to a network slice of a mobile network;
obtaining subscription information associated with the UE, the subscription information including a subscribed slice ID having a slice type value indicating a slice type and having a subscription attribute indicating whether a requirement or preference for registration to a network slice having a best available or alternative level of service for the slice type indicated by the slice type value is enabled or disabled for the UE;
selecting, as an allowed slice ID, a first slice ID of a first network slice in which to register the UE based on availability of the first network slice, the first slice ID having the slice type value indicating the slice type and having a first slice differentiator value associated with a first level of service;
based on unavailability of the slice type having the first slice differentiator value associated with the first level of service and based on the subscription attribute indicating the requirement or preference for registration to a network slice having a best available or alternative level of service for the slice type indicated by the slice type value is enabled, alternatively selecting, as the allowed slice ID, a second slice ID of a second network slice in which to register the UE, the second slice ID having the slice type value indicating the slice type and having a second slice differentiator value associated with a second level of service; and
sending, to the UE, a message which indicates a registration accept including the allowed slice ID.

10. The network node of claim 9, wherein the message which indicates the registration request for registration includes a requested network slice ID comprising the first slice ID.

11. The network node of claim 9, wherein the message which indicates the registration request for registration includes a requested network slice ID comprising a wildcard slice ID, the wildcard slice ID having the slice type value and a wildcard slice differentiator value that is associated with the subscription attribute indicating the requirement or preference for registration to a network slice having a best available or alternative level of service for the slice type indicated by the slice type value.

12. The network node of claim 9, wherein:
the first level of service comprises: a higher level of service than the second level of service, one or more services that are unavailable in the second level of service, or an allocation or reservation of resources according to one or more service parameters that are not provided in the second level of service,
the first network slice is available in a first location and unavailable in a second location,
the second network slice is available in the first location and the second location,
selecting, as the allowed slice ID, the first slice ID of the first network slice is performed when the UE is identified to operate in the first location, and
alternatively selecting, as the allowed slice ID, the second slice ID of the second network slice is performed when the UE is identified to operate in the second location.

13. The network node of claim 9, wherein the instructions executable by the one or more processors for operation as the control plane function for mobility management for:
causing charging information to be communicated to a charging function, the charging information being indicative of charging according to one of the first level of service of the first network slice that is selected for registration or the second level of service of the second network slice that is alternatively selected for registration.

14. The network node of claim 9, wherein the control plane function for mobility management comprises an access and mobility management function (AMF).

15. A computer program product comprising:
a non-transitory computer readable medium;
instructions in the non-transitory computer readable medium; and
the instructions being executable by one or more processors of a control plane function for mobility management including:
receiving, from a user equipment (UE), a message which indicates a registration request for registration to a network slice of a mobile network;
obtaining subscription information associated with the UE, the subscription information including a subscribed slice ID having a slice type value indicating a slice type and having a subscription attribute indicating whether a requirement or preference for registration to a network slice having a best available or alternative level of service for the slice type indicated by the slice type value is enabled or disabled;
selecting, as an allowed slice ID, a first slice ID of a first network slice in which to register the UE based on availability of the first network slice, the first slice ID having the slice type value indicating slice type and having a first slice differentiator value associated with a first level of service;
based on unavailability of the slice type having the first slice differentiator value associated with the first level of service and based on the subscription attribute indicating the requirement or preference for registration to a network slice having a best available or alternative level of service for the slice type indicated by the slice type value is enabled, alternatively selecting, as the allowed slice ID, a second slice ID of a second network slice in which to register the UE, the second slice ID having the slice type value indicating the slice type and having a second slice differentiator value associated with a second level of service; and
sending, to the UE, a message which indicates a registration accept including the allowed slice ID.

16. The computer program product of claim 15, wherein the message which indicates the registration request for registration includes a requested network slice ID comprising the first slice ID.

17. The computer program product of claim 15, wherein the message which indicates the registration request for registration includes a requested network slice ID comprising a wildcard slice ID, the wildcard slice ID having the slice type value and a wildcard slice differentiator value that is associated with the subscription attribute indicating the requirement or preference for registration to a network slice having a best available or alternative level of service for the slice type indicated by the slice type value.

18. The computer program product of claim 15, wherein the first level of service comprises:
a higher level of service than the second level of service, one or more services that are unavailable in the second level of service, or
an allocation or reservation of resources according to one or more service parameters that are not provided in the second level of service.

19. The computer program product of claim 15, wherein the first network slice is available in a first location and unavailable in a second location, and the second network slice is available in the first location and the second location, and wherein the instructions are further executable by the one or more processors of the control plane function for mobility management for:
selecting, as the allowed slice ID, the first slice ID of the first network slice when the UE is identified to operate in the first location, and
alternatively selecting, as the allowed slice ID, the second slice ID of the second network slice when the UE is identified to operate in the second location.

20. The computer program product of claim 15, wherein the instructions are further executable by the one or more processors of the control plane function for mobility management for:
causing charging information to be communicated to a charging function, the charging information being indicative of charging according to one of the first level of service of the first network slice that is selected for registration or the second level of service of the second network slice that is alternatively selected for registration.

* * * * *